US006754415B2

(12) United States Patent
Shin et al.

(10) Patent No.: US 6,754,415 B2
(45) Date of Patent: Jun. 22, 2004

(54) DEVICE FOR SETTING REFERENCE WAVELENGTH IN OPTICAL CHANNEL MONITORING MODULE

(75) Inventors: Keun-Ho Shin, Suwon-shi (KR); Yun-Je Oh, Suwon-shi (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 291 days.

(21) Appl. No.: 09/776,099

(22) Filed: Feb. 2, 2001

(65) Prior Publication Data

US 2001/0010740 A1 Aug. 2, 2001

(30) Foreign Application Priority Data

Feb. 2, 2000 (KR) .......................................... 2000-5120

(51) Int. Cl.[7] .................................................. G02B 6/34
(52) U.S. Cl. ........................................... 385/37; 398/87
(58) Field of Search ........................................... 385/37

(56) References Cited

U.S. PATENT DOCUMENTS 4,700,352 A * 10/1987 Shikada et al. ............... 372/20
5,771,114 A * 6/1998 Andersson et al. ......... 359/171
5,889,901 A * 3/1999 Anderson et al. ............ 385/12
6,021,284 A * 2/2000 Serizawa et al. .............. 399/8
6,081,360 A * 6/2000 Ishikawa et al. ............ 359/161
6,249,365 B1 * 6/2001 Mizrahi et al. ............... 385/37
6,330,383 B1 * 12/2001 Cai et al. ...................... 385/37
6,433,925 B1 * 8/2002 Sakano et al. ......... 359/341.43

FOREIGN PATENT DOCUMENTS

| JP | 07-120326 | 5/1995 | ............. G01J/9/02 |
|---|---|---|---|
| JP | 08-082554 | 3/1996 | ............. G01J/9/02 |
| JP | 08-154076 | 6/1996 | ......... H04B/10/105 |
| JP | 09-186650 | 7/1997 | ........... H04B/10/02 |
| JP | 11-295153 | 10/1999 | ............. G01J/9/04 |

* cited by examiner

*Primary Examiner*—Michael P. Stafira
*Assistant Examiner*—Juan D Valentin, II
(74) *Attorney, Agent, or Firm*—Cha & Reiter, L.L.C.

(57) ABSTRACT

There is provided a reference wavelength setting device in an optical channel monitoring module having a variable filter, comprising: a reference wavelength provider with a light emitting device for outputting wide-band light upon receipt of a driving voltage; a light emitting device driver for switching the driving voltage to the light-emitting device upon the receipt of an emission-on signal; a fiber grating for reflecting only the light at the reference wavelengths from the wide-band light received from the light emitting device; an optical distributor for feeding the wide-band light received from the light-emitting device to the fiber grating and outputting the light at the reference wavelengths reflected by the fiber grating; and, an optical coupler for outputting the light received from the reference wavelength provider to the variable filter.

9 Claims, 1 Drawing Sheet

900
10
200
300
VARIABLE FILTER
400
VARIABLE FILTER DEVICE
500
DAC
ADC
700
PD
600
800
CONTROLLER
SERIAL COM-MUNICATOR
820
TEMPORARY STORAGE
810
100
LIGHT EMITTING DEVICE
LIGHT EMITTING DEVICE DRIVER
112
110
114
116
118
120

DEVICE FOR SETTING REFERENCE WAVELENGTH IN OPTICAL CHANNEL MONITORING MODULE

CLAIM OF PRIORITY

This application claims priority to an application entitled "DEVICE FOR SETTING REFERENCE WAVELENGTH IN OPTICAL CHANNEL MONITORING MODULE", filed with the Korean Industrial Property Office on Feb. 2, 2000 and there duly assigned Serial No. 5120-2000.

BACKGROUND OF THE INVENTION

1. Field of the Invention

The present invention relates generally to an optical communication system, and more particularly to an optical channel-monitoring module in a WDM (Wavelength Division Multiplex) optical communication system.

2. Description of the Related Art

As the demand for optical communication systems has increased, there has arisen a need for the development of wavelength monitoring techniques. An optical channel-monitoring module is typically used to monitor the transmission of an optical signal in a WDM optical network. The function of a monitoring module is to provide information that is used to repair and maintain the optical communication system, including the intensities of the optical signals in the channels, the multiplexed optical signal, the optical signals prior to demultiplexing, and the demultiplexed optical signal.

There are various methods that implement the optical signal monitoring function in accordance with the prior art. Among them, a monitoring module using the wavelength variable filter is widely used. In this method, a preset reference wavelength is introduced to compensate for the instability of a transmission wavelength so that an accurate wavelength can be derived from the reference wavelength. Here, the use of a light source to generate a stable wavelength is a very important aspect in the optical channel monitoring function. The output of an active device, i.e., a laser diode, is typically used as a reference wavelength. However, the implementation of this method requires additional devices, i.e., a stabilizing circuit for stabilizing the output wavelength of the laser diode, thus imposing economic constraints.

Another conventional method uses the position of an ASE (Amplified Spontaneous Emission) light filtered by the fiber gratings in an optical fiber amplifier as a reference wavelength to control the wavelength characteristics. Yet, this method is ineffective in detecting the reference wavelength in a photodiode when the intensity of the input ASE light is low in the absence of an optical fiber amplifier. Thus, an additional device, i.e., optical amplifier, is required.

As is apparent from the above, there is a need for an improved optical wavelength reference and control techniques that avoid additional component requirements and other problems associated with the prior art devices.

SUMMARY OF THE INVENTION

It is, therefore, an object of the present invention to provide a reference wavelength setting device that is inexpensive and that provides a stable reference wavelength needed for a channel monitoring function.

It is another object of the present invention to provide a reference wavelength setting device for providing a stable reference wavelength without using the ASE light of an optical fiber amplifier.

To achieve the above objects, there is provided a reference wavelength setting device in an optical channel-monitoring module with a variable filter, comprising: a light-emitting device for outputting wide-band light upon receipt of a driving voltage; a light-emitting device driver for switching the driving voltage to the light-emitting device upon receipt of an emission-on signal; a fiber grating for reflecting only the light at a particular reference wavelength range from the wide-band light received from the light emitting device; and, an optical distributor for feeding the wide-band light received from the light-emitting device to the fiber grating and outputting the light at the reference wavelengths reflected by the fiber grating.

Another object of the invention is to provide an optical coupler for outputting the light at the reference wavelengths received from a reference wavelength provider to the variable filter.

Further object of the invention is to provide a controller for selectively outputting the emission-on signal to the light emitting device driver in order to monitor the input optical signal.

BRIEF DESCRIPTION OF THE DRAWINGS

The above and other objects, features, and advantages of the present invention will become more apparent from the following detailed description when taken in conjunction with the accompanying drawing that.

DETAILED DESCRIPTION OF THE PREFERRED EMBODIMENT

Figure 1:
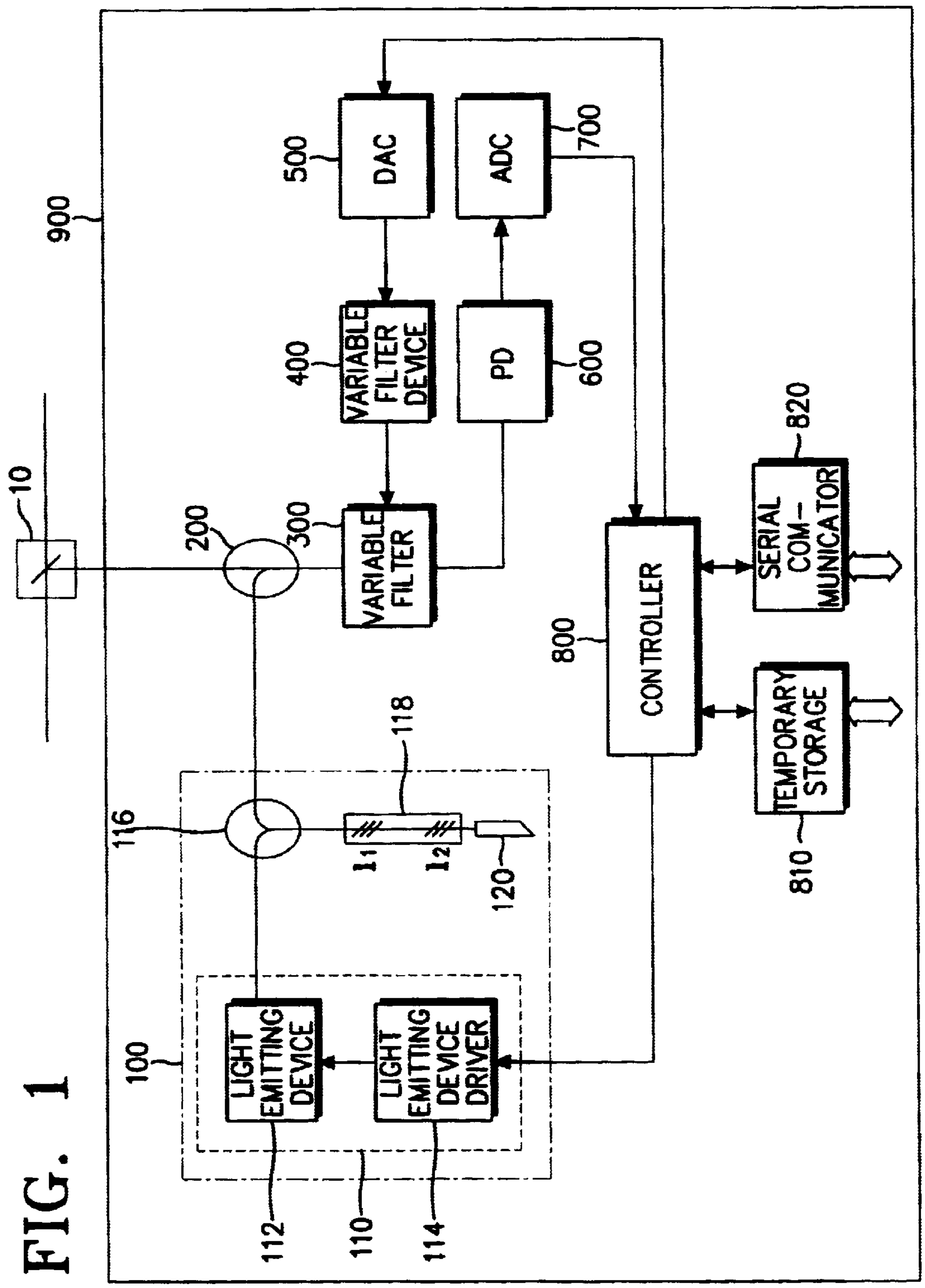
FIG. 1 is a block diagram of an optical channel-monitoring module with a reference wavelength setting device according to a preferred embodiment of the present invention.

A preferred embodiment of the present invention will be described hereinbelow with reference to the accompanying drawings. For the purpose of clarity, well-known functions or constructions are not described in detail as they would obscure the invention in unnecessary detail.

Referring to FIG. 1, the major components of an optical channel-monitoring module 900 capable of setting the reference wavelength according to the embodiment of the present invention includes a reference wavelength provider 100, an optical coupler 200, a variable filter 300, a variable filter driver 400, a digital-to-analog converter (DAC) 500, a photodiode 600, an analog-to-digital converter (ADC) 700, and a controller 800.

The reference wavelength provider 100 is comprised of a light-emitting module 110, fiber gratings 118, and an optical distributor 116. The light-emitting module 110 includes a light emitting device 112 for outputting the light of a wide band upon the receipt of a driving voltage, and a light-emitting device driver 114 for switching the driving voltage to the light-emitting device 112 according to an input emission-on signal received from the controller 800. Here, the light-emitting device 112 produces the wide-band light in the range of 1550 nm.

In the embodiment of the present invention, the fiber gratings 118 reflect only light at specific reference wavelengths from an incident wide-band light received thereon. Here, the fiber gratings 118 are Bragg gratings that can reflect light at the wavelengths satisfying the Bragg condition. According to the present invention, the reference wavelengths can be a short wavelength and/or a long wavelength relative to a bandwidth applied to a WDM system. In the case of a 16-channel WDM system, for example, the bandwidth ranges from 1545.32 to 1557.36 nm. Thus, the reference wavelengths can be set in the range of 1540 nm, which is shorter than the shortest wavelength of the WDM system by approximately 4 nm, and 1562 nm, which is longer than the longest wavelength of the WDM system by approximately 5 nm. An angle physical (APC) fiber 120 is provided at the end of the fiber gratings 118 to prevent light reflection.

The optical distributor 116 feeds the input wide-band light generated from the light-emitting device 112 to the fiber gratings 118, and also feeds light at a particular reference wavelength range that is reflected by the fiber gratings 118 to the optical coupler 200.

The optical coupler 200 couples optical signals at the reference wavelengths received from the optical distributor 116 with optical signals divided by an optical divider 10.

The variable filter 300 filters the coupled optical signals at a predetermined wavelength range to be monitored under the control of the controller 800 via the variable filter driver 400. The variable filter driver 400 provides the driving voltage according to the signals received from the controller 800 via the digital-to-analog converter (DAC) 500. The variable filter 300 is a Febry-Perote variable filter.

The variable filter driver 400 supplies the driving voltage to the variable filter 300 according to the received filter control signal, which is converted from a digital to an analog signal, transmitted from the controller 800. The photodiode 600 converts the filtered optical signal received from the variable filter 300 to an electrical signal.

Accordingly, the controller 800 outputs an emission-on signal to the reference wavelength provider to generate the reference wavelengths, and a filter control signal to the variable filter 300 to selectively filter the wavelength in a predetermined range. The photodiode 600 converts the optical wavelength filtered by the variable filter 300 into the analog signals, which are converted to the corresponding digital signals to be forwarded to the controller 800. When the controller 800 stores the converted digital signals received from the ADC 700 in a temporary storage 810 for temporarily storing the signal information exchanged between optical communication systems. The collected signal information is then used to estimate the performance of the optical systems. A serial communicator 820 is provided for enabling the exchange of the collected optical signal information to an external terminal for performing the monitoring applications.

As described above, the reference-wavelength setting device in the optical channel monitoring module according to the embodiment of the present invention is more economical and stable than the laser diode used in the prior art system as the inexpensive and more stable light-emitting module 110 is used as a wide-band light source. Furthermore, the light-emitting module 110 provides stable reference wavelengths in a controlled manner, thus enabling the inventive device applicable to an optical communication system without having an optical fiber amplifier.

While the invention has been shown and described with reference to a certain preferred embodiment thereof, it will be understood by those skilled in the art that various changes in form and details may be made therein without departing from the spirit and the scope of the invention as defined by the appended claims.

What is claimed is:

1. An apparatus for generating a reference wavelength in an optical channel monitoring module having a variable filter in an optical communications system, comprising:

a light-emitting means for generating wavelengths in a predetermined range;

a light-emitting driver for supplying a driving voltage to said light-emitting means;

at least one fiber grating for reflecting a prescribed wavelength from said generated wavelengths;

an optical distributor for forwarding said generated wavelengths to said fiber grating and for outputting said reflected wavelength by said fiber grating;

an optical coupler for coupling said reflected wavelength outputted from said optical distributor and the wavelength received from said system, and for forwarding said coupled wavelength to said variable filter; and, a controller for selectively outputting an emission-on signal to activate said light emitting driver and for determining the condition of the wavelength in said system based on the output from said variable filter.

2. The apparatus of claim 1, further comprising a temporary storage for temporarily storing the output from said variable filter.

3. The apparatus of claim 1, further comprising a serial communicator coupled to said controller for exchanging the output from said variable filter to an external terminal.

4. The apparatus of claim 1, further comprising a variable filter driver coupled to the inlet of said variable filter for applying a voltage to said variable filter, and a photodiode coupled to the outlet of said variable filter for converting the output from said variable filter into an analog signal.

5. The apparatus of claim 4, further comprising a first converter coupled between said controller and said variable filter device for converting a digital signal received from said controller to a corresponding analog signal, and a second converter coupled between said controller and said photodiode for converting an analog signal outputted from said photodiode to a corresponding digital signal.

6. The apparatus of claim 1, where in said variable filter provides a specific wavelength to be monitored by said controller.

7. An apparatus for generating a reference wavelength in an optical channel monitoring module in an optical communications system, comprising:

a light-emitting means for generating wavelengths in a predetermined range;

a light-emitting driver for supplying a driving voltage to said light-emitting means;

at least one fiber grating for reflecting a prescribed wavelength from said generated wavelengths;

an optical distributor for forwarding said generated wavelengths to said fiber grating and for outputting said reflected wavelength by said fiber grating;

an optical coupler for coupling said reflected wavelength outputted from said optical distributor and the wavelength received from said system;

a variable filter, coupled to receive said coupled wavelength from said coupler, for providing a specific wavelength;

a variable filter driver for applying a driving voltage to said variable filter;

a photodiode for converting the output received from said variable filter to an electrical signal; and, a controller for selectively outputting an emission-on signal to activate said light emitting driver and a filter control signal to activate said variable filter, and for determining the condition of the wavelength in said system based on the output from said variable filter.

8. The apparatus of claim 7, further comprising a temporary storage for temporarily storing the output from said variable filter.

9. The apparatus of claim 7, further comprising a serial communicator coupled to said controller for exchanging the output from said variable filter to an external terminal.

* * * * *